United States Patent [19]
Larsen

[11] Patent Number: 5,953,225
[45] Date of Patent: Sep. 14, 1999

[54] POWER FLOW CONTROL AND POWER RECOVERY WITH ROTARY TRANSFORMERS

[75] Inventor: Einar Vaughn Larsen, Charlton, N.Y.

[73] Assignee: General Electric Co., Schenectady, N.Y.

[21] Appl. No.: 08/967,452

[22] Filed: Nov. 11, 1997

Related U.S. Application Data

[63] Continuation-in-part of application No. 08/828,502, Mar. 31, 1997, which is a continuation of application No. 08/550,941, Oct. 31, 1995, abandoned, which is a continuation-in-part of application No. 08/426,201, Apr. 21, 1995, abandoned.

[51] Int. Cl.⁶ .............................. G05F 1/00; H02M 5/32; H02P 1/54; H02J 1/00
[52] U.S. Cl. .......................... 363/174; 323/201; 318/440; 318/105; 307/74; 307/87
[58] Field of Search .................................. 363/170, 171, 363/174, 175; 323/201, 348; 318/105, 440; 307/72, 73, 74, 75, 76, 87

[56] References Cited

U.S. PATENT DOCUMENTS

| | | | |
|---|---|---|---|
| 3,471,708 | 10/1969 | Rauhut et al. ............................. | 307/85 |
| 3,694,728 | 9/1972 | Kanngiesser et al. ..................... | 363/51 |
| 3,701,938 | 10/1972 | Chadwick ................................. | 363/51 |
| 3,836,837 | 9/1974 | Rauhut ..................................... | 363/150 |
| 3,975,646 | 8/1976 | Kilgore et al. ............................ | 307/21 |
| 4,019,115 | 4/1977 | Lips ......................................... | 363/65 |
| 4,179,729 | 12/1979 | Stanton et al. ........................... | 363/175 |
| 4,238,822 | 12/1980 | Schade .................................... | 363/107 |
| 4,249,237 | 2/1981 | Ronk et al. ............................... | 363/150 |
| 4,251,736 | 2/1981 | Coleman .................................. | 307/46 |
| 4,302,716 | 11/1981 | Glavitsch et al. ........................ | 323/217 |
| 4,336,488 | 6/1982 | Glavitsch et al. ........................ | 323/215 |
| 4,378,587 | 3/1983 | McClain et al. .......................... | 363/174 |
| 4,430,574 | 2/1984 | Ogiwara ................................... | 290/52 |
| 4,441,029 | 4/1984 | Kao .......................................... | 290/52 |
| 4,445,049 | 4/1984 | Steigerwald .............................. | 307/45 |
| 4,489,261 | 12/1984 | Hartwig et al. .......................... | 318/700 |
| 4,490,808 | 12/1984 | Jasmin ..................................... | 364/802 |
| 4,503,377 | 3/1985 | Kitabayahi et al. ...................... | 318/807 |
| 4,517,471 | 5/1985 | Sachs ....................................... | 307/67 |
| 4,625,125 | 11/1986 | Kuwabara ................................ | 290/52 |
| 4,683,718 | 8/1987 | Larsson ................................... | 60/327 |
| 4,694,189 | 9/1987 | Haraguchi et al. ...................... | 290/40 C |
| 4,743,827 | 5/1988 | Shiozaki et al. ......................... | 318/798 |
| 4,754,156 | 6/1988 | Shiozaki et al. ......................... | 290/52 |
| 4,788,647 | 11/1988 | McManus et al. ....................... | 364/494 |
| 4,794,544 | 12/1988 | Albright et al. ......................... | 364/494 |
| 4,804,900 | 2/1989 | Soeda ...................................... | 318/719 |
| 4,806,781 | 2/1989 | Hochstetter .............................. | 290/43 |
| 4,816,696 | 3/1989 | Sakayori et al. ......................... | 290/52 |
| 4,823,018 | 4/1989 | Kuwabara et al. ....................... | 290/7 |
| 4,870,558 | 9/1989 | Luce ........................................ | 363/87 |
| 4,920,277 | 4/1990 | Kuwabara et al. ....................... | 290/40 C |
| 4,922,124 | 5/1990 | Seki et al. ................................ | 307/87 |
| 4,941,079 | 7/1990 | Ooi .......................................... | 363/132 |
| 4,992,721 | 2/1991 | Latos ....................................... | 322/10 |
| 4,994,684 | 2/1991 | Lauw et al. .............................. | 290/52 |
| 5,111,377 | 5/1992 | Higasa et al. ............................ | 363/95 |
| 5,166,597 | 11/1992 | Larsen et al. ............................ | 323/215 |
| 5,239,251 | 8/1993 | Lauw ....................................... | 318/767 |
| 5,341,280 | 8/1994 | Divan et al. .............................. | 363/37 |
| 5,343,139 | 8/1994 | Gyugyi et al. ........................... | 323/207 |
| 5,402,332 | 3/1995 | Kopf ........................................ | 364/149 |
| 5,469,044 | 11/1995 | Gyugyi et al. ........................... | 323/207 |
| 5,550,457 | 8/1996 | Kusase et al. ............................ | 322/29 |
| 5,608,615 | 3/1997 | Luce ........................................ | 363/102 |

FOREIGN PATENT DOCUMENTS

| | | | |
|---|---|---|---|
| 2 170 686 | 10/1996 | Canada ............................ | H02M 5/32 |
| 0 739 087 | 10/1996 | European Pat. Off. .......... | H02P 9/48 |
| 1 488 773 | 4/1969 | Germany ........................ | H02J 45/01 |
| 34 43 428 A1 | 6/1985 | Germany ........................ | H02J 3/34 |
| 1 157 885 | 7/1969 | United Kingdom ............. | H02J 3/06 |
| 2 055 515 | 3/1981 | United Kingdom ............ | H02M 5/32 |

OTHER PUBLICATIONS

Goto et al, "Power System Stabilizing Control by Adjustable Speed Pumped Storage Power Station Using Stabilizing Signals", CIGRE Symposium Tokyo 1995, pp. 1–6.

Puchstein, Lloyd, Conrad, "Alternating–Current Machines", 3rd Edition, John Wiley & Sons, Inc., NY, 1954, pp. 425–428, particularly Fig. 275 on p. 428.

Kron, "Equivalent Circuits of Electric Machinery", John Wiley & Sons, Inc., NY, Chapman & Hall, Ltd., London, 1951, pp. 150–163, particularly Fig. 9.5a on p. 156.

Larsen, et al, "Specification of AC Filters for HBDC Systems", IEEE Y&D Conference, New Orleans, 1989, pp. 1–8.
"Inductrol Voltage Regulators", General Electric Company, Publication 6070, Jun. 1974, pp. 30–31.
"Magnetic Circuits and Transformers", John Wiley & Sons, Inc., New York, pp. 497–515.
"Rotary Converter", Westinghouse Electric & Manufacturing Company, Circular No. 1028, Apr. 1903.

*Primary Examiner*—Peter S. Wong
*Assistant Examiner*—Bao Q. Vu
*Attorney, Agent, or Firm*—Nixon & Vanderhye

[57] ABSTRACT

An interconnection system (100) for transferring power between a first grid (22) operating at a first electrical frequency and a second grid (24) operating at a second electrical frequency includes a rotary transformer (102) and a power recovery system (103). The power recovery system (103) recovers and applies to the transferee grid a power differential attributable to mechanical power channeled to a rotatable shaft (113) of the rotary transformer (102).

13 Claims, 5 Drawing Sheets

POWER FLOW CONTROL AND POWER RECOVERY WITH ROTARY TRANSFORMERS

This application is related to simultaneously-filed U.S. patent application Ser. No. 08/967,445 (attorney docket 17GE5749) entitled "COMPENSATION FOR POWER TRANSFER SYSTEMS USING ROTARY TRANSFORMER", and is a continuation-in-part of U.S. patent application Ser. No. 08/828,502 filed Mar. 31, 1997 by Runkle et al. and entitled "INTERCONNECTION SYSTEM FOR TRANSFERRING POWER BETWEEN ELECTRICAL SYSTEMS", which in turn is a continuation of abandoned U.S. patent application Ser. No. 08/550,941 filed Oct. 31, 1995 by Runkle et al. and entitled "INTERCONNECTION SYSTEM FOR TRANSFERRING POWER BETWEEN ELECTRICAL SYSTEMS", which in turn is a continuation-in-part of abandoned U.S. patent application Ser. No. 08/426,201 filed Apr. 21, 1995 by Mark A. Runkle and entitled "INTERCONNECTION SYSTEM FOR ELECTRICAL SYSTEMS HAVING DIFFERING ELECTRICAL CHARACTERISTIC", all of which are incorporated herein by reference.

TECHNICAL FIELD

This invention pertains to the transmission of power between electrical systems or areas, and particularly to power flow apparatus and method for controlling the transmission of power.

BACKGROUND

There exist a number of areas in the world where interconnections between power systems require an asynchronous link. For some of these areas the power systems have different nominal frequencies (e.g, 60 Hz and 50 Hz). The prevailing technology for accomplishing an asynchronous interconnection between power systems is high voltage direct current (HVDC) conversion. HVDC conversion is complicated due e.g., to the need to closely coordinate harmonic filtering, controls, and reactive compensation. Moreover, HVDC has performance limits when the AC power system on either side has low capacity compared to the HVDC power rating. Further, HVDC undesirably requires significant space, due to the large number of high-voltage switches and filter banks.

Prior art rotary converters utilize a two-step conversion, having both a fully-rated generator and a fully-rated motor on the same shaft. Rotary converters have been utilized to convert power from AC to DC or from DC to AC. However, such rotary converters do not convert directly from AC to AC at differing frequencies. Moreover, rotary converters run continuously at one predetermined speed (at hundreds or thousands of RPMs), acting as motors that actually run themselves.

Rauhut has disclosed a rotary transformer for coupling multiphase systems having a small frequency difference. See, for example, U.S. Pat. No. 3,471,708 to Rauhut wherein a non-synchronous rotary machine has stator windings connected to a first three-phase power system grid and rotor windings connected to a second three-power system grid. If the frequency of one system is different from that of the second system, a torque is exerted on the rotor in one direction or the other so as to cause rotation of the rotor at a rotational rate equal to the different between the network frequencies.

A closed loop angular positioning control system which operates a rotary transformer for transferring power from a first electrical system to a second electrical system is disclosed in U. S. patent application Ser. No. 08/825,502 filed Mar. 31, 1997 by Runkle et al. entitled "INTERCONNECTION SYSTEM FOR TRANSFERRING POWER BETWEEN ELECTRICAL SYSTEMS", which is incorporated herein by reference. Also disclosed therein is connection of a drive motor of the rotary transformer to a 3-phase line connecting the rotary transformer to the second electrical system, which connection results in recovery of mechanical power on the rotating shaft of the rotary transformer. Yet, other manners of power recovery are desired for differing circumstances.

DISCLOSURE OF THE INVENTION

An interconnection system for transferring power between a first grid operating at a first electrical frequency and a second grid operating at a second electrical frequency includes a rotary transformer and a power recovery system. The power recovery system recovers and applies to the transferee grid a power differential attributable to mechanical power channeled to a rotatable shaft of the rotary transformer. The power recovery system can be operated bidirectionally.

Various embodiments of the power recovery system are provided. In one embodiment, the power recovery system includes a motor controller connected between a drive motor of the rotary transformer and the second grid, and which adjusts to wide swings in frequency of the two grids. In a second embodiment, a single line connects the drive motor of the rotary transformer and the second grid, the drive motor having a number of poles selected such that the rotational speed of the rotary shaft corresponds to the frequency of the grid to which it is connected. In a third embodiment, the power recovery system includes an ac exciter and polyphase set of field windings and can be used to control torque on the drive motor via the frequency of power supplied via the ac exciter.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

BEST MODE FOR CARRYING OUT THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
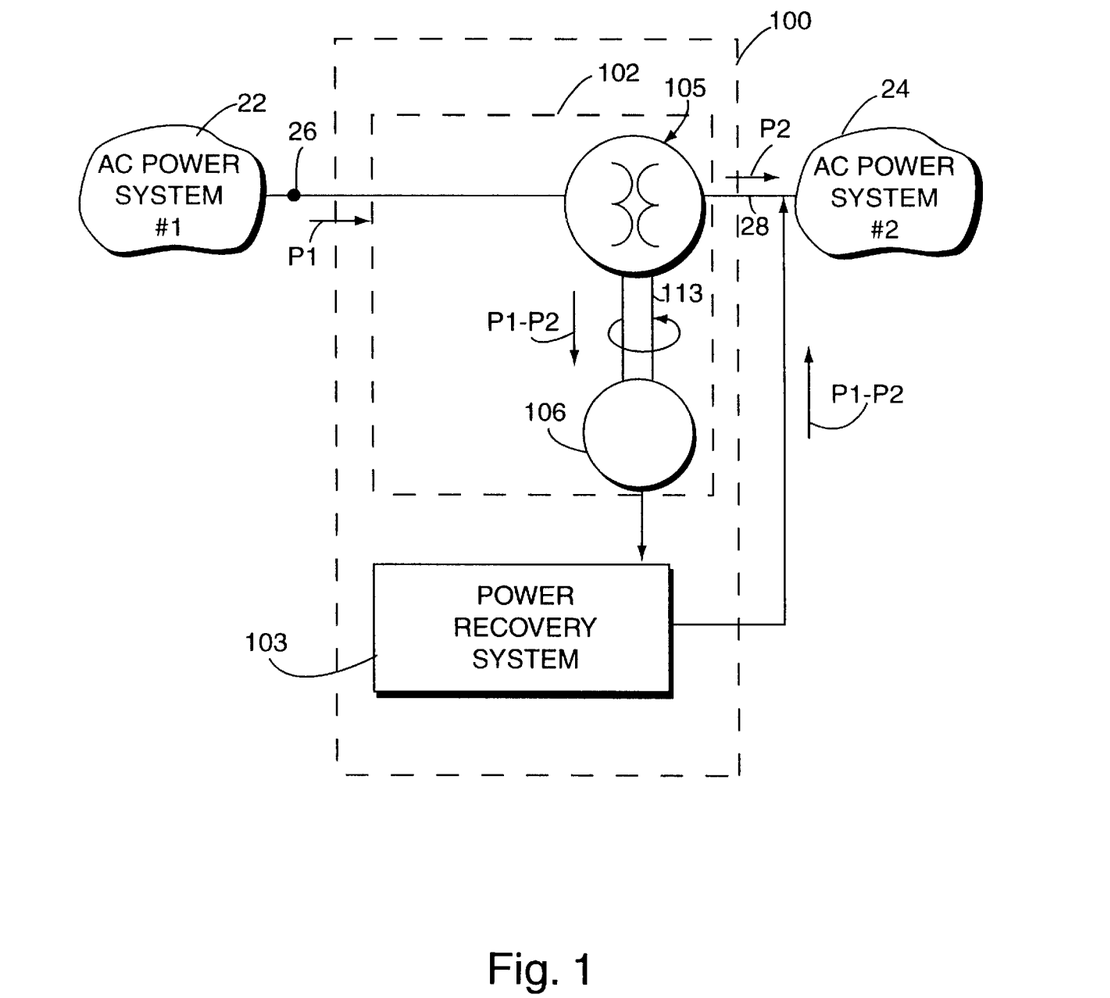
FIG. 1 is schematic view of an electrical power interconnection system according to an embodiment of the invention.

FIG. 1 shows an electrical power interconnection system 100 connected between a first grid or AC electrical power system 22 and a second grid or electrical AC power system 24. Power interconnection system 100 is connected to grid 22 by 3-phase line 26 and to grid 24 by 3-phase line 28.

Power interconnection system 100 includes a variable frequency transformer 102 and a power recovery system 103. As shown in more detail below with reference to FIG. 2, variable frequency transformer 102 is connected by 3-phase lines SA, SB, SC (included in line 26) to first AC Power system 22 and by 3-phase lines RA, RB, and RC (included in line 28) to second AC Power System 24.

The first grid 22 and the second grid 24 have a differing electrical characteristic, such as differing electrical frequency. In the particular example illustrated, grid 22 operates at 60 Hz and grid 24 operates at 50 Hz. It should be understood that while these frequencies are common, the principles of the present invention can be applied when one or both of the grids 22, 24 operate at other frequencies.

As shown in FIG. 1, variable frequency rotary transformer 102 includes both a rotary transformer assembly 105 and a torque control unit 106 (also known as the rotor drive motor or drive motor). As shown in more detail in FIG. 2, rotary transformer assembly 105 includes both a rotor subassembly 110 and a stator 112. Rotor subassembly 110 includes a rotatable shaft 113, collector rings 114 (also known as slip ring), and rotor cage section 116. Three-phase lines RA, RB, RC leading to second AC Power System 24 are connected to collector rings 114; three-phase lines SA, SB, and SC leading from first AC Power System 22 are connected to stator 112.

Figure 2:
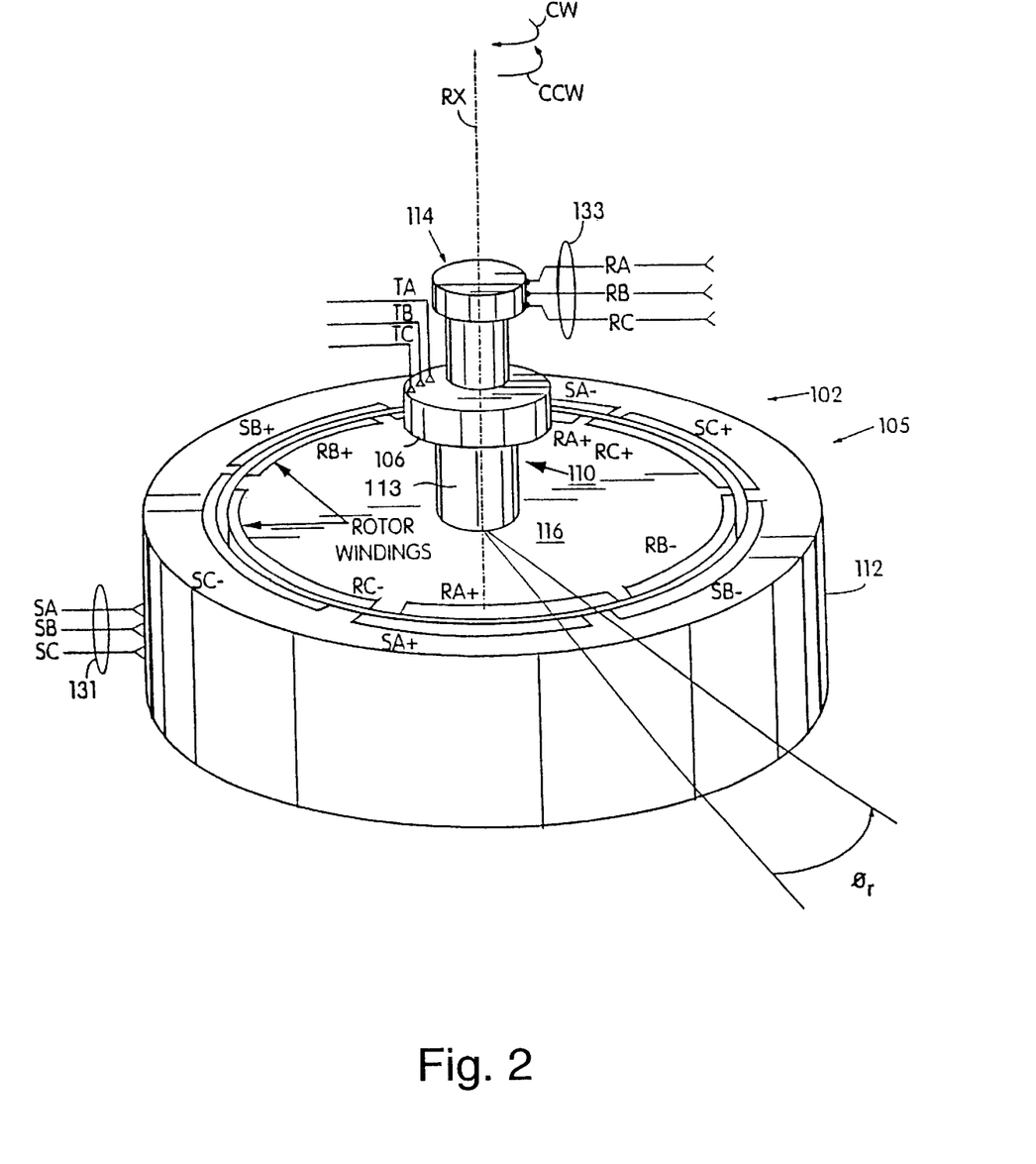
FIG. 2 is a partial schematic, partial perspective view of rotary transformer according to an embodiment of the invention.

As shown in FIG. 2 and understood by the man skilled in the art, in the illustrated embodiment rotary transformer assembly 105 is wound with sixty degree phase belts, with rotor windings being labeled as RA+, RC−, RB+, RA−, RC+, and RB− and stator windings labeled as SA+, SC−, SB+, SA−, SC+, and SB−. It should be understood that the invention is not limited to a sixty degree phase belt-wound system, rather the principles of the invention are applicable for rotary transformer assemblies of phase two and greater.

Rotor assembly 110 is rotatable about its axis RX in both clockwise direction CW and counter-clockwise direction CCW. Rotation of rotor assembly 110 is effected by rotor drive section 106, also known as the drive motor.

Rotor drive section 106 is shown symbolically in FIG. 2 as a cylindrical section mounted on rotor assembly 110. Thus, rotor drive section 106 of FIG. 2 generally depicts various alternative and different types of drive mechanisms for causing rotation of rotor assembly 110. In some embodiments, rotor drive section 106 includes an actuator and some type of linkage (e.g., gearing) which interfaces with rotor assembly 110. For example, in one embodiment rotor drive section 106 comprises a motor which is controlled through a conventional motor drive. Any suitable drive mechanism may be employed for rotor drive section 106.

Power recovery system 103 serves to recover, at least in part, a power wattage differential between the power applied to a first set of windings of rotary transformer 102 and the power obtained from the second set of windings. For example, if a power wattage of 120MW is applied as shown by arrow P1 in FIG. 1 from grid 22 (60 Hz) to the first set of windings (e.g., stator windings labeled as SA+, SC−, SB+, SA−, SC+, and SB) of rotary transformer 102, only 100MW comes through on the second set of windings of rotary transformer 102 (e.g., rotor windings being labeled as RA+, RC−, RB+, RA−, RC+, and RB) as indicated by arrow P2. The remaining 20MW (i.e., P1−P2) appears as mechanical power on shaft 113 of rotary transformer 102 to drive motor 106. Assuming that the number of poles of drive motor 106 is four, shaft 113 rotates at 300 rpm, reflecting the 10 Hz difference between grid 22 and grid 24. For other frequency differences or pole numbers the rotational speed varies. The relative power on shaft 113 is proportional to the frequency difference between the rotor and stator windings (e.g., the first and second sets of windings of rotary transformer 102).

Power recovery system 103 thus serves to recover the power P1−P2 channeled through mechanical power to shaft 113, so that the power differential P1−P2 is applied to grid 24, augmenting the power wattage P2 applied to grid 24 from the second set of windings of rotary transformer 102. Differing embodiments of power recovery system 103 are discussed below.

Figure 1A:
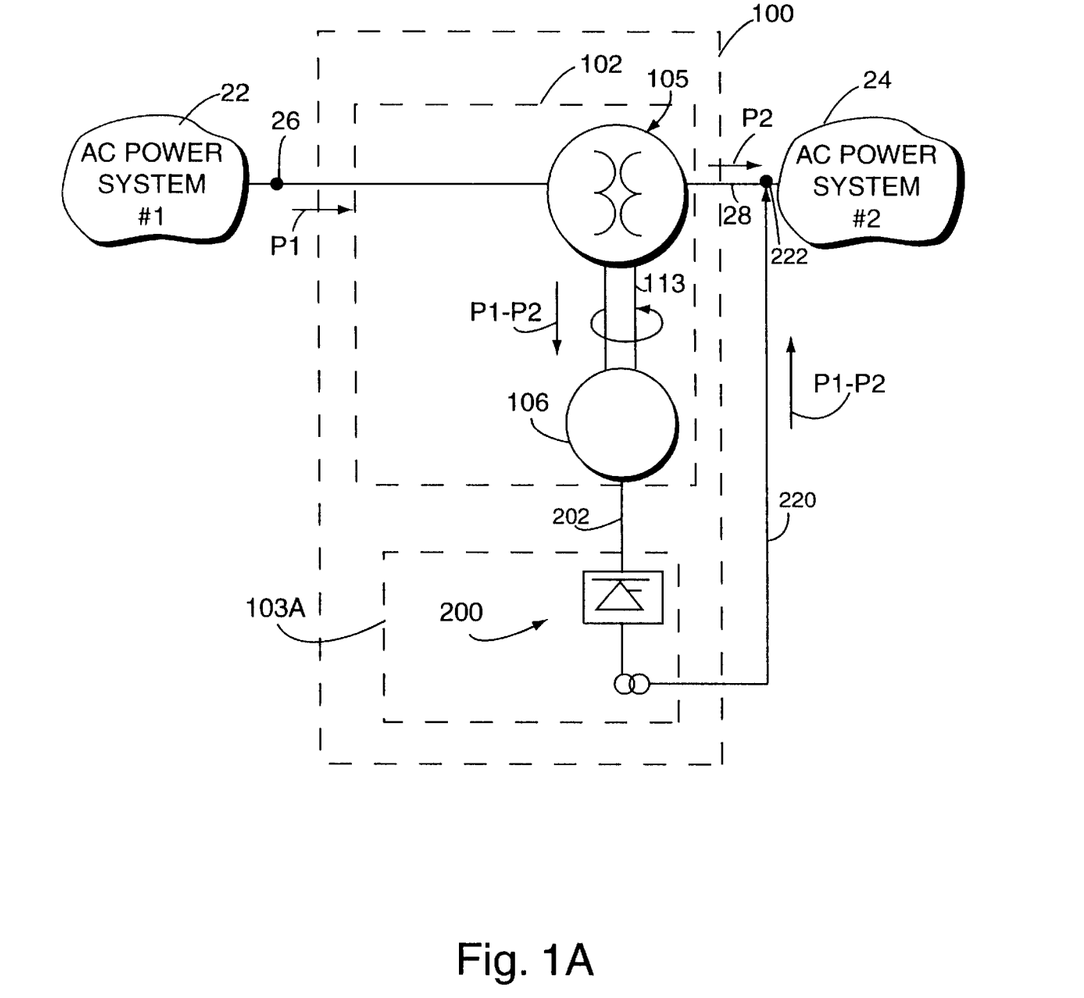
FIG. 1A, FIG. 1B, and FIG. 1C show electrical power interconnection systems having differing embodiments of power recovery systems.

FIG. 1A shows an embodiment of the present invention wherein power recovery system 103A includes motor control system 200. Motor control system 200 is a power-electronic system for controlling drive motor 106, and comprises a conventional motor drive system programmed to regulate power flow from AC system 22 to AC system 24 according to the principles described in U. S. patent application Ser. No. 08/825,502, already incorporated herein by reference. The motor control system 200 is connected by line 202 to the stator windings of drive motor 106. The matching transformer of motor control system 200 is connected by line 220 to a point 222 whereat line 220 is connected to line 28 for supplying power to grid 24.

In the example shown for the embodiment of FIG. 1A, drive motor 106 is a four pole motor, rated for 20MW. Power control system 200 is rated equal to drive motor 106 (e.g., 20MW in the present example). The power wattage (P1−P2) recovered by power recovery system 103A from shaft 113 (20MW at 50 Hz) is applied back to grid 24 on line 220 to complete the transfer of substantially the entire power wattage P1 (e.g., 120MW) from the 60 Hz grid 22 to the 50 Hz grid 24.

The embodiment of FIG. 1A provides great flexibility for regulating power transfer between grids, as the motor control system 200 can adjust to wide swings in the frequency of the two grids connected by rotary transformer 102.

Figure 1B:
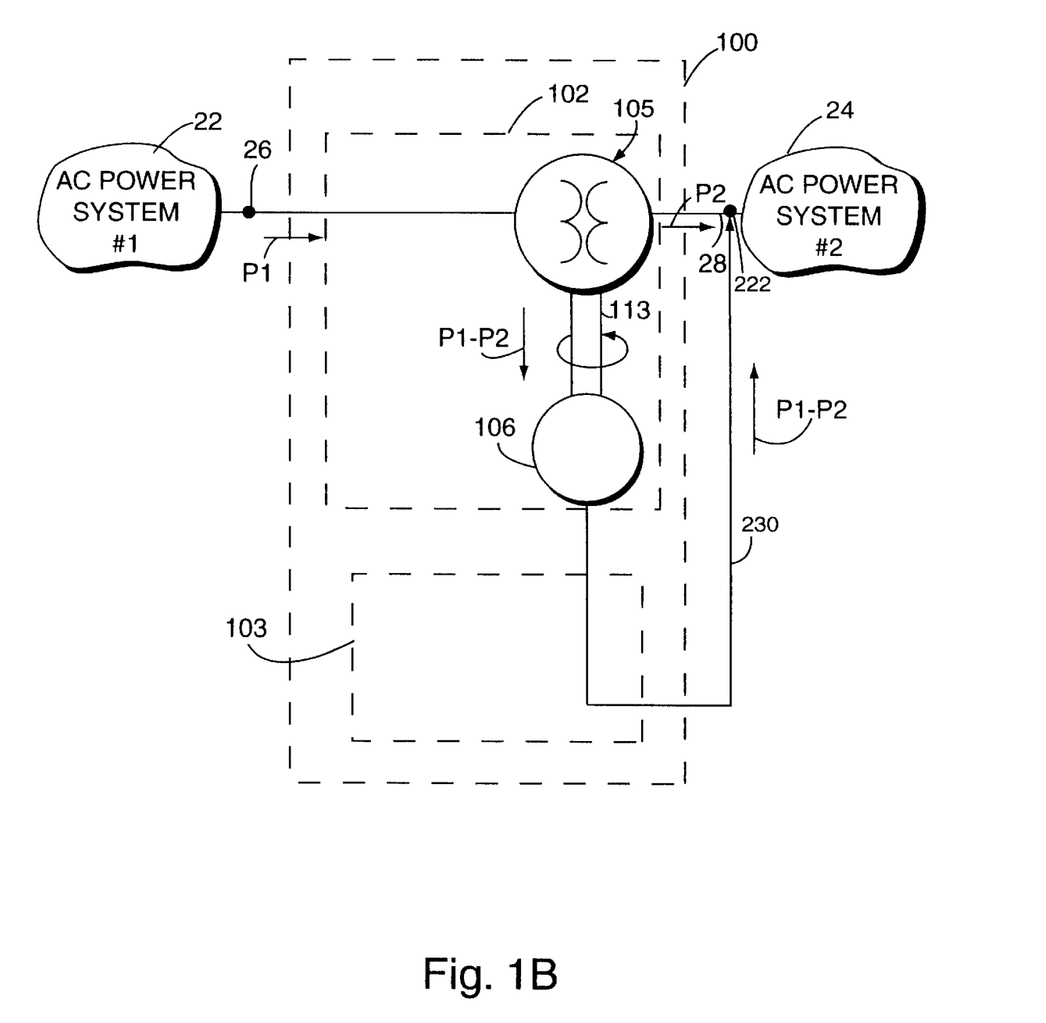

FIG. 1B shows an embodiment of power recovery system 103B which comprises no motor controller, but instead a single line 230 connecting the stator windings of drive motor 106 to line 28 at point 222. In the embodiment of FIG. 1B, the number of poles on drive motor 106 is selected such that the rotational speed of shaft 113 corresponds (preferably exactly) to the frequency of the grid to which it is connected (e.g., grid 24). In the particular situation illustrated in FIG. 1B, drive motor 106 has twenty poles and converts the 300 rpm speed of shaft 113 to 50 Hz for application of 20MW to grid 24.

If, in the embodiment of FIG. 1B, drive motor 106 were of a synchronous type, then grids 22 and 24 transfer power according to the phase relationship between grids 22 and 24, which cannot be controlled by the variable rotary transformer 102.

If drive motor 106 of the embodiment of FIG. 1B were an induction machine, power transfer between grids 22 and 24 varies in proportion to the frequency differences of grids 22 and 24 according to the torque-slip characteristic of drive motor 106. When the frequencies of grids 22 and 24 are exactly at their nominal (e.g., 60 Hz for grid 22 and 50 Hz for grid 24), no power transfer will occur. Selecting a slightly different number of poles in the drive machine will bias the power transfer in a certain direction. For example, if twenty two poles were used in the motor, the point at which zero power transfer occurs would correspond to a rotor speed of 272.7 revolutions per minute or a frequency difference of 9.09 Hz between the sending and receiving systems.

Figure 1C:
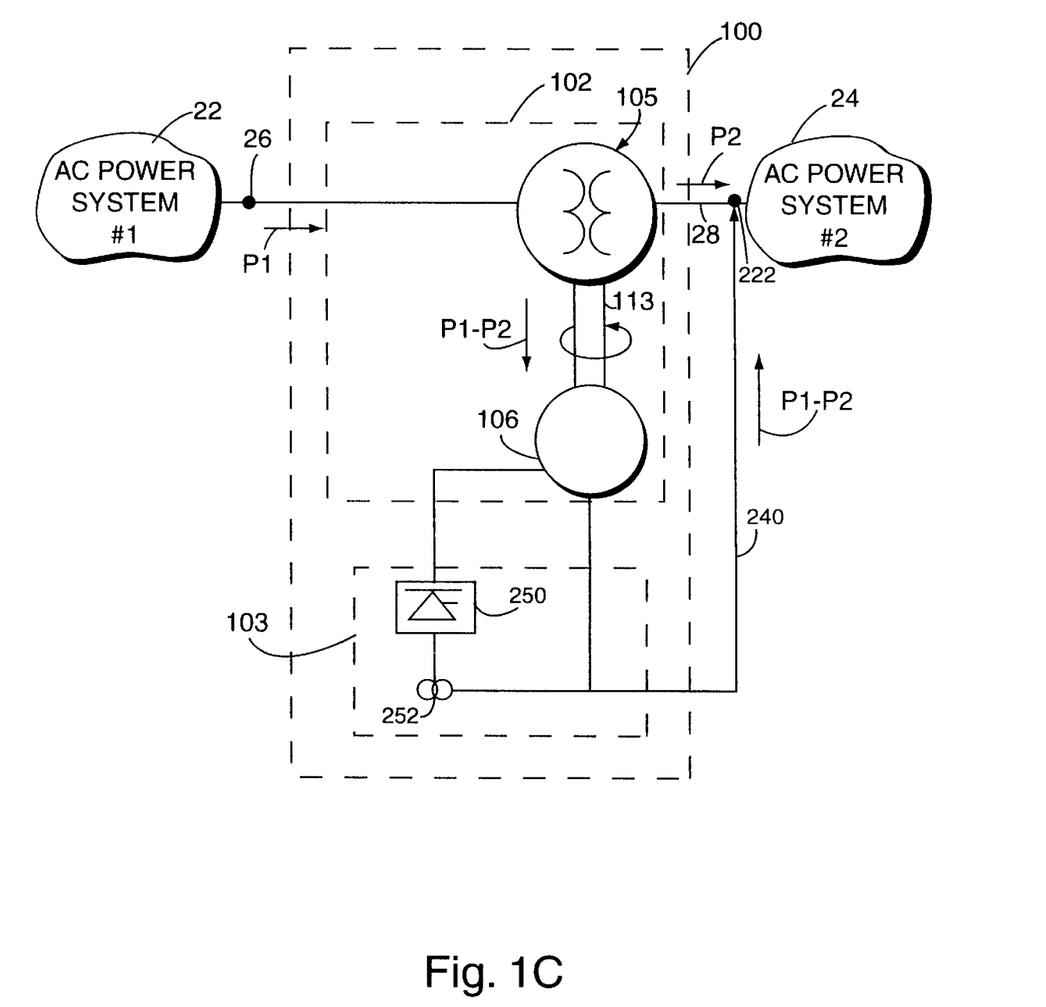

FIG. 1C shows an embodiment of power recovery system 103B which comprises a line 240 connecting the stator windings of drive motor 106 to point 222 (i.e., to line 28). In addition, power recovery system 103B includes an ac exciter 250 connected to the polyphase set of field windings. In the illustrated example, drive motor 106 is an eighteen pole machine, so that ac exciter 250 is normally supplying 5 Hz to field windings 252. Other combinations of factors are possible, such as (for example) a twenty pole drive motor 106 and having normally direct current on the field.

In the case of FIG. 1C, drive motor 106 is controllable via the frequency of power supplied by ac exciter 250. Hence, power transfer through the entire rotary transformer 102 can be controlled. FIG. 1C thus is an asynchronous tie with power control over a range of frequency deviations on the separate transmission grids.

Whereas grid 22 has been illustrated as connected to stator windings of rotary transformer 102 and grid 24 connected to rotor windings, it should be understood that such connections can be reversed if desired. Additionally, other parameters of the systems can depart from those exemplary illustrated, such as (for example) the number of poles of drive motor 106.

As understood from the foregoing, power transfer using the systems described above can be bidirectional.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for transferring power between a first grid and a second grid, the first grid operating at a first power wattage and a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

the first winding being connected to the first grid and having the first electrical frequency applied thereto, the second winding being connected to the second grid and being at the second electrical frequency, a second power wattage being generated through an electromagnetic coupling of the first winding and the second winding at the rotary transformer, the second power wattage being different than the first power wattage; and a power recovery system connected to the rotary transformer for obtaining recovered power from the rotating shaft and for adding at least some of the recovered power to the second power wattage for application to the second grid, the power recovery system comprising a power-electronic control connected between the drive motor and the second grid.

2. The system of claim 1, wherein the number of poles is twenty, the rotational speed of the rotatable shaft is 300 rpm, and the second electrical frequency is 50 Hz.

3. A system for transferring power between a first grid and a second grid, the first grid operating at a first power wattage and a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

the first winding being connected to the first grid and having the first electrical frequency applied thereto, the second winding being connected to the second grid and being at the second electrical frequency, a second power wattage being generated through an electromagnetic coupling of the first winding and the second winding at the rotary transformer, the second power wattage being different than the first power wattage; and a power recovery system connected to the rotary transformer for obtaining recovered power from the rotating shaft and for adding at least some of the recovered power to the second power wattage for application to the second grid, the power recovery system comprising a line connected from the drive motor to the second grid, and wherein a number of poles on the drive motor is selected such that a rotational speed of the rotatable shaft corresponds to the frequency of the second grid.

4. The system of claim 3, wherein the number of poles is twenty, the rotational speed of the rotatable shaft is 300 rpm, and the second electrical frequency is 50 Hz.

5. The system of claim 3, wherein the drive motor is an induction machine, and wherein power transfer between the first grid and the second grid varies in proportion to the difference of the first electrical frequency and the second electrical frequency in accordance with a torque-slip characteristic of the drive motor.

6. The system of claim 5, wherein a different number of poles in the drive motor directionally biases power transfer.

7. A system for transferring power between a first grid and a second grid, the first grid operating at a first power wattage and a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

the first winding being connected to the first grid and having the first electrical frequency applied thereto, the second winding being connected to the second grid and being at the second electrical frequency, a second power wattage being generated through an electromagnetic coupling of the first winding and the second winding at the rotary transformer, the second power wattage being different than the first power wattage; and a power recovery system connected to the rotary transformer for obtaining recovered power from the rotating shaft and for adding at least some of the recovered power to the second power wattage for application to the second grid, the power recovery system comprising an ac exciter connected between the drive motor and a polyphase set of field windings, the polyphase set of field windings being connected to the second grid.

8. The system of claim 7, wherein the drive motor has eighteen poles, and wherein the ac exciter supplies 5 Hz to the polyphase set of field windings.

9. A method of transferring power from a first grid operating at a first electrical frequency and a first power wattage to a second grid operating at a second electrical frequency, the method comprising:

applying the first electrical frequency to a first winding of a rotary transformer and obtaining a second power wattage at a second winding of the rotary transformer, the second power wattage being different than the first power wattage;

recovering, from a drive motor of a rotating shaft of the rotary transformer, power from rotation of the rotating shaft;

providing a number of poles on the drive motor such that rotational speed on the rotatable shaft corresponds to the frequency of the second grid; and adding the recovered power to the second grid for augmenting the second power wattage.

10. The method of claim 9, wherein the step of recovering power from the rotation of the rotating shaft includes using an induction machine as the drive motor, and wherein power transfer between the first grid and the second grid varies in proportion to the difference of the first electrical frequency and the second electrical frequency in accordance with a torque-slip characteristic of the drive motor.

11. The method of claim 10, wherein a different number of poles in the drive motor directionally biases power transfer.

12. A method of transferring power from a first grid operating at a first electrical frequency and a first power wattage to a second grid operating at a second electrical frequency, the method comprising:

applying the first electrical frequency to a first winding of a rotary transformer and obtaining a second power wattage at a second winding of the rotary transformer, the second power wattage being different than the first power wattage;

recovering, from a drive motor of a rotating shaft of the rotary transformer, power from rotation of the rotating shaft;

adding the recovered power to the second grid for augmenting the second power wattage;

wherein the step of recovering power from the rotation of the rotating shaft includes using a power-electronic control system connected between the drive motor and the second grid.

13. A method of transferring power from a first grid operating at a first electrical frequency and a first power wattage to a second grid operating at a second electrical frequency, the method comprising:

applying the first electrical frequency to a first winding of a rotary transformer and obtaining a second power wattage at a second winding of the rotary transformer, the second power wattage being different than the first power wattage;

recovering, from a drive motor of a rotating shaft of the rotary transformer, power from rotation of the rotating shaft;

adding the recovered power to the second grid for augmenting the second power wattage;

wherein the step of recovering power from the rotation of the rotating shaft includes using an ac exciter connected to the drive motor, the ac exciter being connected to a polyphase set of field windings, the polyphase set of field windings being connected to the second grid.

\* \* \* \* \*